United States Patent
Arai et al.

(10) Patent No.: US 9,896,591 B2
(45) Date of Patent: Feb. 20, 2018

(54) PENCIL LEAD

(71) Applicant: MITSUBISHI PENCIL COMPANY, LIMITED, Tokyo (JP)

(72) Inventors: Hiroyuki Arai, Fujioka (JP); Satoru Banzai, Fujioka (JP)

(73) Assignee: MITSUBISHI PENCIL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/366,228

(22) Filed: Dec. 1, 2016

(65) Prior Publication Data

US 2017/0174923 A1    Jun. 22, 2017

(30) Foreign Application Priority Data

Dec. 18, 2015  (JP) ................................ 2015-247089

(51) Int. Cl.
| | | |
|---|---|---|
| *C09D 13/00* | (2006.01) | |
| *C08K 3/36* | (2006.01) | |
| *C09D 163/00* | (2006.01) | |

(52) U.S. Cl.
CPC ........... *C09D 13/00* (2013.01); *C09D 163/00* (2013.01)

(58) Field of Classification Search
CPC ......... C09D 13/00; C09D 163/00; C08K 3/36
See application file for complete search history.

(56) References Cited

U.S. PATENT DOCUMENTS

| | | | | |
|---|---|---|---|---|
| 5,595,589 A | * | 1/1997 | Hoshiba | B43K 19/18 |
| | | | | 106/31.11 |
| 2012/0037035 A1 | * | 2/2012 | Banzai | B43K 19/02 |
| | | | | 106/31.11 |

FOREIGN PATENT DOCUMENTS

| | | |
|---|---|---|
| JP | 61-23667 A | 2/1986 |
| JP | 61-293275 A | 12/1986 |
| JP | 04-164978 A | 6/1992 |
| JP | 06-136315 A | 5/1994 |
| JP | 06-192613 A | 7/1994 |
| JP | 7-126568 A | 5/1995 |
| JP | 2641810 B2 | 8/1997 |
| JP | 2726198 B2 | 3/1998 |
| JP | 2000-26785 A | 1/2000 |
| JP | 2002-348516 A | 12/2002 |
| JP | 2015-160887 A | 9/2015 |

OTHER PUBLICATIONS

Yoshiki Chujo, "Organic-Inorganic Nano-Hybrid Materials", The Micromeritics, Hosokawa Powder Technology Research Institute Co., Ltd., Oct. 30, 2006, No. 50, pp. 11-15, cited in the specification, w/English partial translation (6 pages).

Extended European Search Report dated Mar. 10, 2017, issued in counterpart European Patent Application No. 16201462.5. (6 pages).

* cited by examiner

*Primary Examiner* — Vu A Nguyen

(74) *Attorney, Agent, or Firm* — Westerman, Hattori, Daniels & Adrian, LLP

(57) ABSTRACT

A pencil lead includes an organic-inorganic hybrid resin inside fine pores of a porous lead body. A colorant may also be included inside the fine pores. The organic-inorganic hybrid resin is preferably a silica-organic hybrid resin.

4 Claims, No Drawings

PENCIL LEAD

CROSS-REFERENCE TO RELATED APPLICATION

This application is based on and claims priority under 35 USC 119 from Japanese Patent Application No. 2015-247089 filed on Dec. 18, 2015, the disclosure of which is incorporated by reference herein.

BACKGROUND OF THE INVENTION

1. Field of the Invention

The present invention relates to a pencil lead that includes an organic-inorganic hybrid resin in fine pores in a porous lead body.

2. Description of the Prior Art

Pencil leads are broadly divided into black leads having graphite as a main component, and colored leads in which a pigment or dye is added to a filler as a colorant. The black leads undergo a sintering process during the manufacturing process, and some of the colored leads are sometimes manufactured by a similar sintering process. Pencil leads manufactured by such sintering processes exhibit a porous structure having countless fine pores.

In most cases, colored leads (so-called colored pencil leads) manufactured by sintering are first manufactured as an initially white or pale-colored porous lead body, and then a dye ink is caused to impregnate the fine pores of the lead body. In the invention disclosed in JP 2015-160887 A, a resin is filled into fine pores in order to strengthen the lead body.

Note that colored pencil leads formed with fine pores can also be manufactured without undergoing a sintering process (Japanese Pat. Nos. 2641810 and 2726198, and JP H07-126568 A and JP 2000-26785). Technology has been described in which, in order to prevent degradation over time due to moisture absorption, the surface of such an unsintered colored pencil lead is coated with an organic-inorganic hybrid material to form a moisture-proof film (JP 2002-348516 A).

The organic-inorganic hybrid material described in JP 2002-348516 A is described as a "formulation of an inorganic material and an organic material", "especially those in which mixing occurs on the nanoscale, and sometimes on the molecular scale". Such organic-inorganic hybrid materials have the characteristic of being "excellent in mechanical strength and high heat tolerance while being flexible like plastics" (see "Organic-Inorganic Nano-Hybrid Materials" by Yoshiki CHUJO, The Micromeritics, Hosokawa Powder Technology Research Institute Co., Ltd., Oct. 30, 2006, No. 50, p. 11-p. 15).

The present invention concerns further increasing the mechanical strength of a pencil lead by incorporating an organic-inorganic hybrid resin having these characteristics into fine pores of a pencil lead that exhibits porous structure, irrespective of whether the lead is a black lead or a colored lead.

Solution to Problem

SUMMARY OF INVENTION

In consideration of the above circumstances, a pencil lead according to the invention includes an organic-inorganic hybrid resin inside fine pores of a porous lead body.

Here, the "pencil lead" of the invention not only encompasses leads fitted into wooden shafts in ordinary pencils, but also leads having a diameter of from approximately 2 mm to approximately 3 mm, fitted into so-called a lead holder so as to be capable of being refilled, and so-called mechanical pencil leads. The lead may be a black lead, or may be a colored lead. The main material of the lead may be graphite, boron nitride, or the like, and is not particularly limited. Any lead having fine pores is suitable, regardless of whether the porous lead body is formed by sintering, or is formed without using a sintering process.

In cases of a colored lead, a colorant may also be included in the fine pores of the pencil lead according to the invention by adding the colorant at the same time as, or before or after, incorporation of the organic-inorganic hybrid resin into a white or pale-colored porous lead body. Any ordinarily used pigment, dye, or the like may be employed as the colorant, and there are no particular limitations thereto.

Although the type of organic-inorganic hybrid resin is not particularly limited, a silica-organic hybrid resin is preferably employed. Here, "silica-organic hybrid resin" refers to a hybrid resin in which silica serves as the inorganic material and a synthetic organic resin serves as the organic material. More specifically, a resin that is generally commercially available may be employed, such as a silica-epoxy hybrid resin, a silica-phenol hybrid resin, a silica-polyamic acid hybrid resin, a silica-polyamide hybrid resin, or a silica-acrylic hybrid resin. However, from the viewpoint of pencil lead strength after impregnation, it is particularly preferable to employ a silica-epoxy hybrid resin.

The invention enables the mechanical strength of a pencil lead to be further increased by incorporating an organic-inorganic hybrid resin into fine pores of a pencil lead that exhibits a porous structure, irrespective of whether the lead is a black lead or a colored lead.

DESCRIPTION OF PREFERRED EMBODIMENT OF THE INVENTION (1) Boron Nitride Sintered Lead Body Powdered boron nitride and a resin that becomes a binder are combined (a plasticizer may be added, if appropriate), and the combined composition is kneaded. The kneaded product is formed into a thin linear shape by extrusion. The formed product is then sintered by beating in an oxygen-free atmosphere such as in an inert gas, and a sintered lead body is formed from boron nitride and a carbon binder. Sintering this sintered lead body by heating in an oxygen-containing atmosphere oxidizes and removes the carbon binder to give a porous sintered lead body of only boron nitride. The porous sintered lead body is white.

The white porous sintered lead body is immersed in a liquid mixture of a colorant, an organic-inorganic hybrid resin (in particular, a silica-organic hybrid resin), and an organic solvent for a specific amount of time, and the colorant and the organic-inorganic hybrid resin are thus incorporated into the fine pores. The organic solvent is then removed by drying.

Finally, the porous sintered lead body is immersed in oil, thereby impregnating the fine pores with the oil, so as to complete the colored lead. Any substance generally used for impregnating a sintered lead body, such as liquid paraffin, may be employed as the oil.

Here, depending on the thickness when forming the kneaded product by extrusion, the colored lead may be formed with a final diameter of from approximately 2 mm to approximately 3 mm as a pencil lead for a wooden shaft or as a lead holder refill lead, or may be formed with a final diameter of from approximately 0.3 mm to approximately 1 mm as a refill lead for mechanical pencils of varying thicknesses.

Note that the addition of the colorant may be omitted when the porous sintered lead body is immersed in the organic-inorganic hybrid resin so as to form a white lead.

(2) Sintered Graphite Lead Body

Powdered or flake graphite and a resin that becomes a binder are combined (a plasticizer may be added, if appropriate), the combined composition is mixed and dispersed, and then kneaded. The kneaded product is then formed into a thin linear shape by extrusion. The formed product is then sintered by heating in an oxygen-free atmosphere such as an inert gas so as to form a sintered lead body formed from the graphite and the carbon binder. The porous sintered lead body is black.

The black porous sintered lead body is immersed in liquid mixture of a colorant, an organic-inorganic hybrid resin (in particular, a silica-organic hybrid resin), and an organic solvent for a specific amount of time, thereby incorporating the colorant and the organic-inorganic hybrid resin into the fine pores. The organic solvent is then removed by drying.

Finally, the porous sintered lead body is immersed in oil, thereby impregnating the fine pores with the oil, so as to complete the colored lead having low color saturation and an underlying black color. Any substance generally used for impregnating a sintered lead body, such as liquid paraffin, may be employed as the oil.

Here, depending on the thickness when forming the kneaded product by extrusion, the colored lead may be formed with a final diameter of from approximately 2 mm to approximately 3 mm as a pencil lead for a wooden shaft or as a lead holder refill lead, or may be formed with a final diameter of from approximately 0.3 mm to approximately 1 mm as a refill lead for mechanical pencils of varying thicknesses.

Note that the addition of the colorant may be omitted when the porous sintered lead body is immersed in the organic-inorganic hybrid resin so as to form a black lead.

(3) Unsintered Lead Body

A formulation is made of: a fluorine resin such as graphite fluoride, carbon fluoride, or polytetrafluoride ethylene, or a water and oil repellent substance such as boron nitride; a binding material such as carboxymethyl cellulose; and a colorant. An equivalent mass of water is then added to the formulation composition, which is then mixed and dispersed, and the water content is then adjusted while kneading. The kneaded product is then formed into a thin linear shape by extrusion. The water component is then removed by drying to form a porous unsintered lead body.

The porous unsintered lead body is immersed in a liquid mixture of the organic-inorganic hybrid resin (in particular, a silica-organic hybrid resin), and an organic solvent for a specific amount of time, thereby incorporating the organic-inorganic hybrid resin into the fine pores. The organic solvent is then removed by drying, and a colored lead is completed.

Here, depending on the thickness when forming the kneaded product by extrusion, the colored lead may be formed with a final diameter of from approximately 2 mm to approximately 3 mm as a pencil lead for a wooden shaft or as a lead holder refill lead, or may be formed with a final diameter of from approximately 0.3 mm to approximately 1 mm as a refill lead for mechanical pencils of varying thicknesses.

EXAMPLES (1) Boron Nitride Sintered Lead Body (1-1) Example 1

A composition of the formulation listed in Table 1 below was kneaded using a pressure kneader and a two-roll mill, the kneaded product was formed into a thin linear shape by extruding with an extrusion machine and then sintered at 1,000° C. for 5 hours in an inert gas (nitrogen gas) atmosphere to obtain a sintered lead body formed from boron nitride and the carbon binder (BN lead).

TABLE 1

| Component | Formulation ratio (% mass) |
|---|---|
| Boron nitride powder | 50 |
| Polyvinyl chloride resin (binder resin) | 40 |
| Dioctyl phthalate (plasticizer) | 10 |

The BN lead was further sintered at 700° C. for 12 hours in an air atmosphere, and a sintered lead body formed from only boron nitride was produced. A silicate 40 (COLCOAT) was impregnated into this product, and after drying, a white sintered lead body was obtained by sintering at 1,000° C. for 5 hours in an inert atmosphere.

The white sintered lead body was impregnated with a composition of the formulation listed in Table 2 formed from a silica-organic hybrid resin, a colorant, and an organic solvent. The white sintered lead body was then dried at 80° C. for 12 hours.

TABLE 2

| Component | Formulation ratio (% mass) |
|---|---|
| COMPOCERAN E203 (silica-epoxy hybrid resin, Arakawa Chemical Industries, Ltd.) | 20 |
| SPIRON RED C-PH (pigment colorant, Hodogaya Chemical, Co., Ltd.) | 20 |
| Isopropyl alcohol (organic solvent) | 60 |

Fine pores obtained by the drying were impregnated with α-olefin oil (SPECTRASYN 4, Exxon Mobil Corporation) at 100° C. for 6 hours to obtain a red mechanical pencil lead having a diameter of 0.564 mm and a length of 60 mm.

(1-2) Example 2

A red mechanical pencil lead was obtained similarly to in Example 1, except in that the COMPOCERAN E203 formulation ratio listed in Table 2 was set to 50% by mass, and the formulation ratio of isopropyl alcohol was set to 30% by mass.

(1-3) Example 3

A red mechanical pencil lead was obtained similarly to in Example 1, except in that the COMPOCERAN E203 formulation ratio listed in Table 2 was set to 5% by mass, and the formulation ratio of isopropyl alcohol was set to 75% by mass.

(1-4) Example 4

A red mechanical pencil lead was obtained similarly to in Example 1, except in that COMPOCERAN AC601 (silica-acrylic hybrid resin, Arakawa Chemical Industries, Ltd.) was employed instead of the COMPOCERAN E203 listed in Table 2.

(1-5) Example 5

A red mechanical pencil lead was obtained similarly to in Example 1, except in that COMPOCERAN SL404 (silica-silicone hybrid resin, Arakawa Chemical Industries, Ltd.) was employed instead of the COMPOCERAN E203 listed in Table 2.

(1-6) Comparative Example 1

A red mechanical pencil lead was obtained similarly to in Example 1, except in that YS. POLYESTER K-125 (terpene-phenol copolymer, Yasuhara Chemical Co., Ltd.), serving as an ordinary resin, was employed instead of the COMPOCERAN E203 listed in Table 2.

(1-7) Comparative Example 2

A red mechanical pencil lead was obtained similarly to in Example 1, except in that the formulation ratio of the COMPOCERAN E203 listed in Table 2 was set to 3% by mass, and the formulation ratio of the isopropyl alcohol was set to 77% by mass.

(1-8) Comparative Example 3

A red mechanical pencil lead was obtained similarly to in Example 1, except in that the formulation ratio of the COMPOCERAN E203 listed in Table 2 was set to 60% by mass, and the formulation ratio of the isopropyl alcohol was set to 20% by mass.

(2) Graphite Sintered Lead Body

(2-1) Example 6

A composition of the formulation listed in Table 3 below was mixed and dispersed using a Henschel mixer, and was kneaded using a pressure kneader and a two-roll mill. The kneaded product was formed into a thin linear shape by extruding using an extrusion machine. Subsequently, the plasticizer was removed by drying, and then a black sintered lead body (graphite lead) formed from graphite and carbon binder was obtained by sintering at 1,000° C. for 10 hours in an inert gas (nitrogen gas) atmosphere.

TABLE 3

| Component | Formulation ratio (% mass) |
| --- | --- |
| Natural flake graphite A | 40 |
| Polyvinyl chloride resin (binder resin) | 40 |
| Sodium stearate (surfactant) | 1 |
| Dioctyl phthalate (plasticizer) | 19 |

The natural flake graphite A has an a-b plane with a flatness of 0.2 µm, has a mean volume diameter of 8 µm, has a thickness of 1 µm along the c-axis, and has an aspect ratio of 8.

This graphite lead was impregnated with a composition of the formulation listed in Table 2 above, and was dried at 80° C. for 12 hours.

The fine pores obtained by drying were impregnated with an α-olefin oil (SPECTRASYN 4, Exxon Mobil Corporation) at 100° C. for 6 hours to obtain a red-black mechanical pencil lead having a diameter of 0.564 mm and a length of 60 mm.

(2-2) Example 7

A red-black mechanical pencil lead was obtained similarly to in Example 6, except in that the COMPOCERAN E203 formulation ratio listed in Table 2 was set to 50% by mass, and the formulation ratio of isopropyl alcohol was set to 30% by mass.

(2-3) Example 8

A red mechanical pencil lead was obtained similarly to in Example 6, except in that the COMPOCERAN E203 formulation ratio listed in Table 2 was set to 5% by mass, and the formulation ratio of isopropyl alcohol was set to 75% by mass.

(2-4) Comparative Example 4

A red-black mechanical pencil lead was obtained similarly to in Example 6, except in that YS. POLYESTER K-125 (terpene-phenol copolymer, Yasuhara Chemical Co., Ltd.), serving, as an ordinary resin, was employed instead of the COMPOCERAN E203 listed in Table 2.

(2-5) Comparative Example 5

A red-black mechanical pencil lead was obtained similarly to in Example 6, except in that the COMPOCERAN E203 formulation ratio listed in Table 2 was set to 3% by mass, and the formulation ratio of isopropyl alcohol was set to 77% by mass.

(2-6) Comparative Example 6

A red-black mechanical pencil lead was obtained similarly to in Example 6, except in that the COMPOCERAN E203 formulation ratio listed in Table 2 was set to 60% by mass, and the formulation ratio of isopropyl alcohol was set to 20% by mass.

(3) Testing Method

(3-1) Strength Testing

Bending strength was measured for 100 samples according to JIS S 6005:2007, and an average value was found.

The evaluation standards were as follows.

For BN leads, 250 MPa or above is graded "A", less than 250 MPa but no less than 220 MPa is graded "B", and less than 220 MPa is graded "C".

For graphite leads, 430 MPa or above is graded "A", less than 430 MPa but no less than 400 MPa is graded "B", and less than 400 MPa is graded "C".

(3-2) Abrasion Testing

Density testing defined by JIS S 6005:2007 (wherein, the writing angle was set to 90°, load was set to 2.94 N, and the writing distance was set to 5 m; tracing paper was used as the line drawing surface in order to promote abrasion) was used to measure the pencil lead length of ten samples after having performed writing, a difference (mm) from the original length was calculated, and an average value was found.

The evaluation standards were as follows.

For BN leads, 3.0 mm or above is graded "A", less than 3 mm but no less than 2.6 mm is graded "B", and less than 2.6 mm is graded "C".

For graphite leads, 2.0 mm or above is graded "A", less than 2 mm but no less than 1.5 mm is graded "B", and less than 1.5 mm is graded "C".

(3-3) Density Testing

Density tests defined by JIS S 6005:2007 were used to perform the following measurements for drawn lines of pencil leads that had performed writing.

For BN leads, measurements were made for ten samples in four locations each using a densitometer (PDA 65, Konica Minolta, Inc.), and C* values were found. The evaluation standards were such that a C* value of 20 or above was graded "A", a value of less than 20 but no less than 15 was graded "B", and a value of less than 15 was graded "C".

For graphite leads, ten samples were measured in four locations each using a densitometer (PDA 65, Konica Minolta, Inc.), and D values were found. The evaluation standards were such that a D value of 0.4 or above was graded "A", a value of less than 0.4 but no less than 0.3 was graded "B", and a value of less than 0.3 was graded "C".

(4) Testing Results

Each testing result of (3) above was as listed in Table 4 below.

higher strength. Moreover, even in Example 3, which had a markedly small silica-organic hybrid resin content of 5% by mass, the value was greater than for the Comparative Example 1, which employed ordinary resin, the evaluation was also "B", and showed higher strength.

Similar results can be seen for the graphite leads, for Example 6 and Comparative Example 4, which have the same resin content of 20% by mass, the former was evaluated "A" while the latter was evaluated "C", and the former showed higher strength. Moreover, even in Example 8, which had a markedly small silica-organic hybrid resin content of 5% by mass, the value was greater than for the Comparative Example 4, which employed ordinary resin, the evaluation was also "B", and showed higher strength.

Although strength was higher than for the ordinary resin, the BN lead of Example 3 and the graphite lead of Example 8, which had a silica-organic hybrid resin content of 5% by mass, were evaluated "B" and had lower strength than the other Examples. The BN lead of Comparative Example 2 and the graphite lead of Comparative Example 5, which had an even lower silica-organic hybrid resin content of 3% by mass, were both evaluated "C" similarly to Comparative Example 1 and Comparative Example 4, and had inferior strength compared to cases in which the content was 5% by mass. Thus, it is considered preferable for the silica-organic hybrid resin content in the impregnated composition to be 5% by mass or greater such that strength is sufficiently exhibited.

The BN leads of Example 4 and Example 5, which employed resins other than silica-epoxy hybrid resins as the silica-organic hybrid resin, were respectively evaluated "A" and "B" and were excellent overall. However, Examples 4

TABLE 4

| No. | Lead | Resin content in impregnated composition | | Strength | | Abrasion | | Density |
| --- | --- | --- | --- | --- | --- | --- | --- | --- |
| | | Hybrid resin (% mass) | Ordinary resin (% mass) | MPa | Evaluation | mm | Evaluation | |
| Example 1 | BN | 20 | | 262 | A | 3.2 | A | A |
| Example 2 | BN | 50 | | 281 | A | 2.7 | B | B |
| Example 3 | BN | 5 | | 228 | B | 3.6 | A | A |
| Example 4 | BN | 20 | | 254 | A | 3.2 | A | A |
| Example 5 | BN | 20 | | 231 | B | 3.5 | A | A |
| Comparative Example 1 | BN | | 20 | 212 | C | 3.8 | A | A |
| Comparative Example 2 | BN | 3 | | 210 | C | 3.7 | A | A |
| Comparative Example 3 | BN | 60 | | 292 | A | 2.5 | C | C |
| Example 6 | Graphite | 20 | | 431 | A | 2.0 | A | A |
| Example 7 | Graphite | 50 | | 454 | A | 1.8 | B | B |
| Example 8 | Graphite | 5 | | 405 | B | 2.4 | A | A |
| Comparative Example 4 | Graphite | | 20 | 393 | C | 2.5 | A | A |
| Comparative Example 5 | Graphite | 3 | | 396 | C | 2.5 | A | A |
| Comparative Example 6 | Graphite | 60 | | 465 | A | 1.4 | C | C |

Firstly, the contribution of the silica-organic hybrid resin (listed as the "hybrid resin" in Table 4) to the strength of both the BN lead and the graphite lead was large. Namely, for the BN lead, although Example 1 and Comparative Example 1 both have the same impregnated composition content of 20% by mass, the former was evaluated "A" while the latter was evaluated "C", and the former showed and 5 had lower strength values than Example 1, which had the same resin content but employed a silica-epoxy hybrid resin. Thus, from the viewpoint of strength, silica-epoxy hybrid resins can be considered more suitable than other resins as the silica-organic hybrid resin.

Next, in the abrasion testing and the density testing, the BN lead of Example 2 and the graphite lead of Example 7, which had high silica-organic hybrid resin content of 50% by mass, were evaluated slightly lower at "B". The BN lead of Comparative Example 3 and the graphite lead of Comparative Example 6, which had even greater silica-organic hybrid resin content of 60% by mass, were evaluated at "C", which was even more inferior. This is thought to be because impregnation with oil, which promotes abrasion, becomes difficult as the proportion of resin content contained in the fine pores increases. Accordingly, from the viewpoint of promoting abrasion, it is considered preferable for the silica-organic hybrid resin content to be less than 60% by mass.

What is claimed is:

1. A pencil lead, comprising:
   a porous lead body having fine pores therein, and
   an organic-inorganic hybrid resin inside the fine pores of the porous lead body,
   wherein the organic-inorganic hybrid resin comprises an inorganic component covalently bound to an organic component.

2. The pencil lead of claim 1, further comprising a colorant inside the fine pores.

3. The pencil lead of claim 1, wherein the organic-inorganic hybrid resin is a silica-organic hybrid resin.

4. The pencil lead of claim 2, wherein the organic-inorganic hybrid resin is a silica-organic hybrid resin.

* * * * *